C. H. Latham,

Caster.

No. 4208. Reissued Dec. 20. 1870.

Witnesses
J. P. Crawford
Edward E. Osborn

C. H. Latham
By R. A. Dwight Jr. Attorney

N. PETERS, PHOTO-LITHOGRAPHER, WASHINGTON, D. C.

United States Patent Office.

CYRUS H. LATHAM, OF LOWELL, MASSACHUSETTS, ASSIGNOR TO WOODS, SHERWOOD & CO., OF SAME PLACE.

Letters Patent No. 104,743, dated June 28, 1870; reissue No. 4,208, dated December 20, 1870.

DIVISION A.

IMPROVEMENT IN TABLE-CASTERS.

The Schedule referred to in these Letters Patent and making part of the same.

Be it known that I, CYRUS H. LATHAM, of Lowell, in the county of Middlesex and State of Massachusetts, have invented certain Improvements in Table-Casters, of which the following is a specification.

*Nature and Objects of the Invention.*

My invention relates to table-casters; and

It consists in a novel construction of a caster of twisted wire, as will be fully set forth.

*General Description.*

Figure 2:
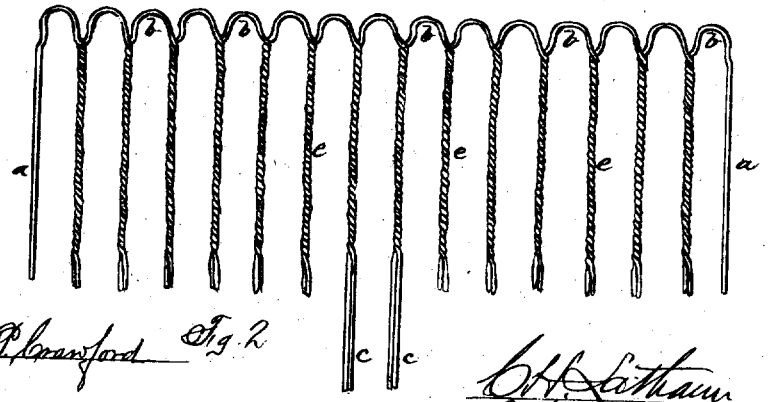

Each cup A of the caster is composed of a series of wires, *a*, doubled upon themselves to form the bows *b*, and twisted together into the several strands *c c*, as illustrated by fig. 2.

The wires *c c* may be made longer than the others, to form, when twisted together, the leg C, or the legs may be made separate.

Figure 3:
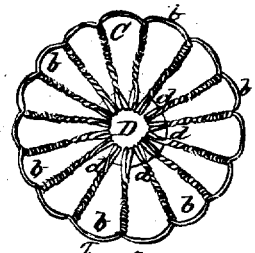
Figures 2, 3, and 4 are detail views, showing the construction of the cups.
Figure 4:
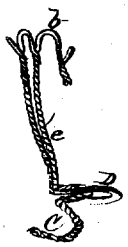
Figure 1:
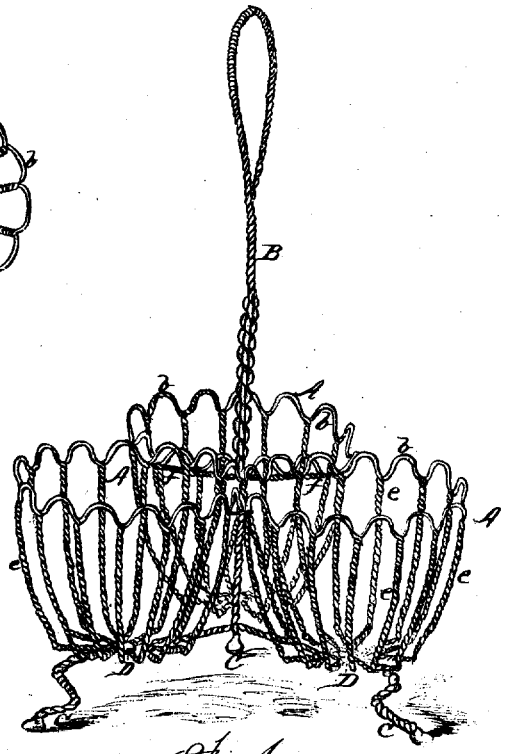
Figure 1 is a perspective view of my improved caster.
Figure 5:
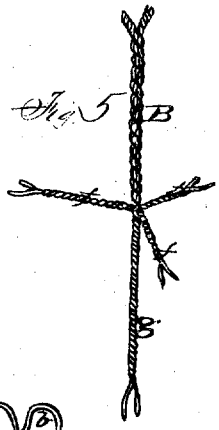
Figure 5 is a view of the lower portion of the handle of the caster.

When thus formed the two wires, *a a*, at the ends of the blank, fig. 2, are twisted together, and the ends are bent up after being passed through the ring D, as illustrated in figs. 3 and 4.

The required shape is given to the cups before they are united together, by means of dies or otherwise.

The handle B is composed of strands of wire twisted together and bent at the center into the loop F, to form the curved part of the handle.

From about the point B down to the tops of the cups the strands are twisted together to form the thick part of the handle, and then the separate strands are formed into the connection *g* and braces *f f f*.

The cups and handle are united by twisting the ends of the braces *f* around one of the ribs *e* of each cup, and connecting the rings D, by the braces E E E, with the lower end *g* of the handle.

The method of forming the cups as described enables them to be expanded or contracted to accommodate them to the different sizes or shapes of the bottles that may be used. This is of considerable importance, as the bottles often vary in size.

The caster, when completed, is coated by dipping it into a bath of metal.

*Claim.*

The caster herein described, consisting of the handle, cups, and legs of twisted wire, combined and arranged substantially in the manner described and specified.

CYRUS H. LATHAM.

Witnesses:

EDWARD E. OSBORN,

C. A. DURGIN.